United States Patent [19]

Jacobson

[11] 4,183,650
[45] Jan. 15, 1980

[54] REMOTE SHUTTER RELEASE MECHANISM FOR CAMERA CONTAINED IN SOUNDPROOF HOUSING

[76] Inventor: Irving Jacobson, 862 Vine St., Hollywood, Calif. 90038

[21] Appl. No.: 948,207

[22] Filed: Oct. 3, 1978

[51] Int. Cl.² .............................................. G03B 17/38
[52] U.S. Cl. ..................................... 354/266; 354/288
[58] Field of Search ................. 354/64, 266, 269, 288, 354/354, 81; 181/200; 352/35, 179

[56] References Cited

U.S. PATENT DOCUMENTS

| | | | |
|---|---|---|---|
| 2,487,868 | 11/1949 | Grigsby | 354/64 |
| 2,679,186 | 5/1954 | Schulte | 352/179 |
| 2,944,474 | 7/1960 | Dennis | 354/64 |
| 3,160,227 | 12/1964 | Hautala | 354/354 X |

*Primary Examiner*—John Gonzales
*Attorney, Agent, or Firm*—Edward A. Sokolski

[57] ABSTRACT

A camera is enclosed in a soundproof housing or "blimp" so as to effectively silence distracting noises generated by the camera in operating situations where such noises cannot be tolerated. Means are provided for silently and reliably actuating the shutter release mechanism of the camera from the outside of the soundproof housing, comprising a push rod which fits through the housing wall at one end thereof and is resiliently fastened to the wall of the housing at the other. The push rod engages a cam blade, this blade having a sloped surface formed at one end thereof. This one end of the cam blade is fitted into a slotted portion of a holder device which extends downwardly from one of the housing walls towards the shutter release button of the camera. A plunger extends out from this holder device into engagement with the shutter release button, the plunger being driven by the sloped surface of the cam blade to actuate the shutter release button when the push rod is manually operated.

7 Claims, 5 Drawing Figures

U.S. Patent        Jan. 15, 1980        4,183,650
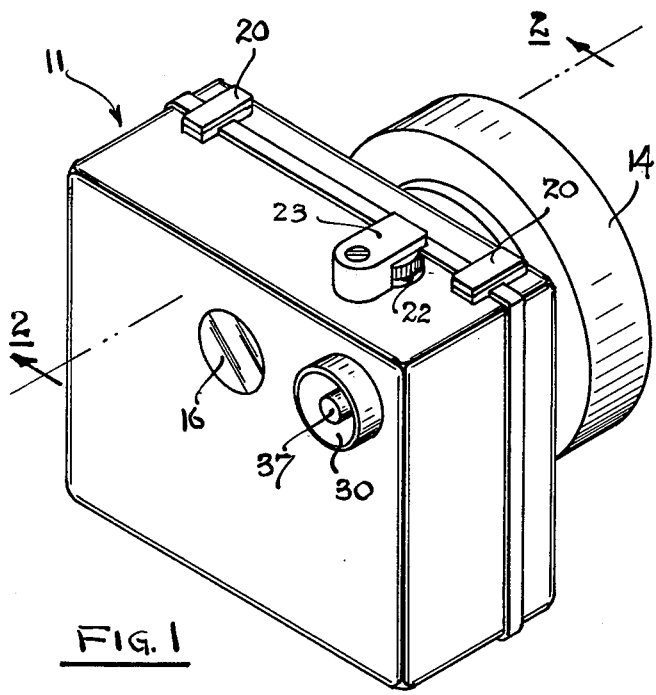
FIG.1
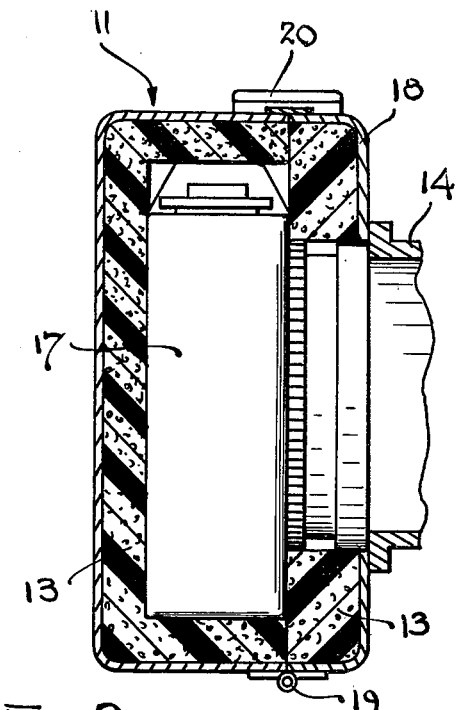
FIG.2
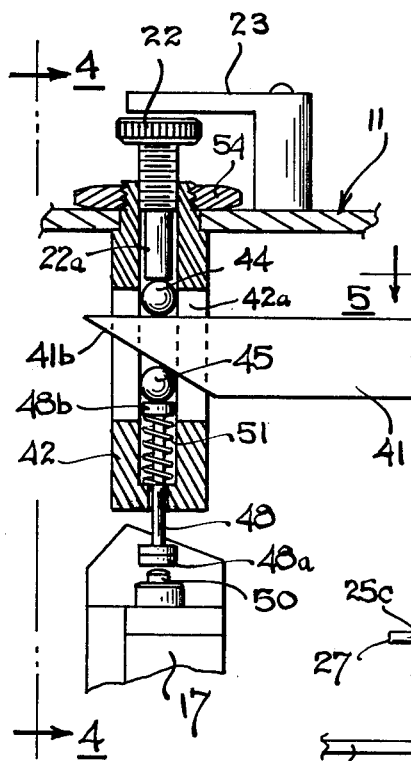
FIG.3
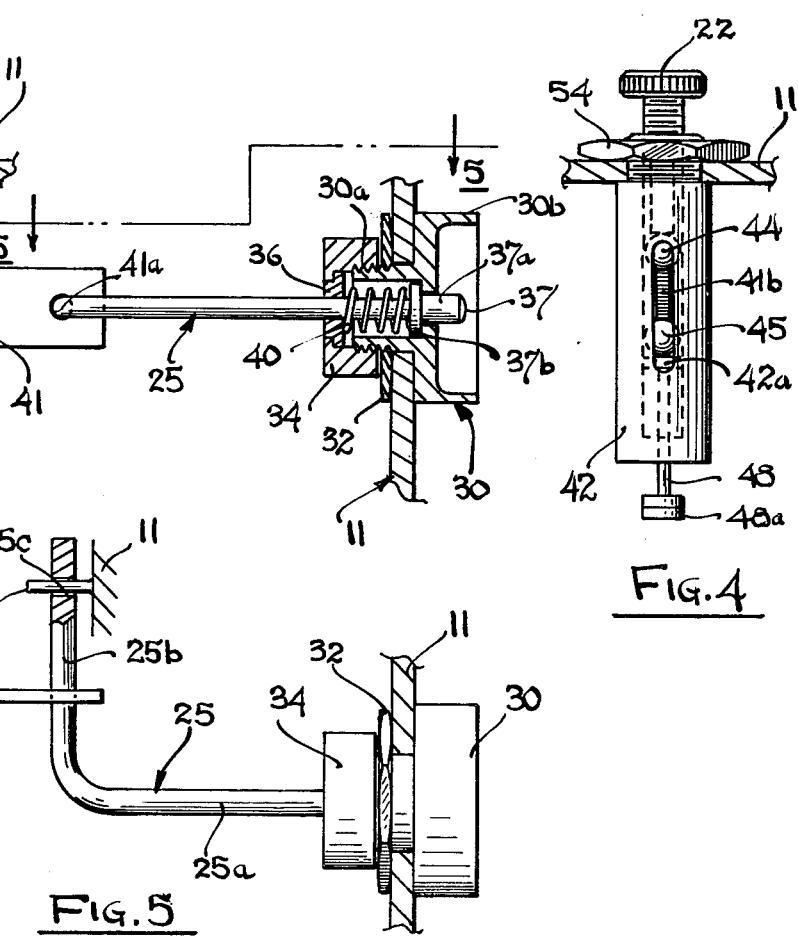
FIG.4
FIG.5

REMOTE SHUTTER RELEASE MECHANISM FOR CAMERA CONTAINED IN SOUNDPROOF HOUSING

This invention relates to sound proof camera enclosures, and more particularly to a shutter release mechanism for use in actuating the shutter release button of a camera contained within such enclosure from the outside of the enclosure.

Where a camera, particularly one utilizing a motorized winding mechanism, is to be used in an environment such as motion picture and T.V. sound stages, operating room, or in wildlife or surveillance photography, it is necessary to provide means for silencing the various noises incidental to such camera operation, such as occur in the operation of the winding and the shutter mechanisms. To handle this situation, soundproof housings have been developed which are commonly known as "blimps". One type of such enclosure is shown, for example, in U.S. Pat. No. 3,160,227, to I. R. Hautala issued Dec. 8, 1964. In this type of device, the camera is entirely enclosed within a housing which has soundproofing material along its inner walls surrounding the camera. A window is provided for the camera lens and means are provided for actuating the camera shutter release mechanism from outside of the housing.

Prior art mechanisms for this purpose generally do not have the reliability of operation to be desired, or the sturdiness of construction conducive to long time trouble free use. Typical such prior art mechanical shutter actuating mechanisms involve actuators which are attached directly to the shutter actuating mechanism. Some of such actuators have a tendency to break or become damaged. Further, they do not provide a ready means of positioning adjustment so that their operation can be adapted for proper use in various different cameras. Further, certain types of prior art actuators have portions of their sliding actuating mechanism outside of the soundproof housing, which may lead to the generation of small amounts of noise which would be objectionable.

The present invention overcomes the shortcomings of the prior art and provides a simple highly reliable shutter actuating mechanism which can be operated from the outside wall of a soundproof camera housing. All of the actuating mechanism is contained within the housing except for the operating pushbutton such that the generation of noise is completely eliminated. Further, the actuator mechanism of the present invention includes position adjustment means which enables its adjustment relative to the camera shutter release button for precise operation of the shutter at all times and with all cameras which may be installed in the housing.

Briefly described, the device of the present invention achieves the aforementioned improved operation by employing a push rod which has one end thereof fitted through a mounting assembly in one of the housing walls, a pushbutton being attached to this one end of the push rod and extending outside of the housing. The push rod is bent at right angles and fits through an aperture in a cam blade member, the other end of the push rod being supported on a resilient support pin attached to the housing. The cam blade has a sloped surface at one end thereof, this one end of the blade being supported in a holder member between a pair of bearings. A plunger member extends from one of the bearings outside the holder to a position directly above the camera shutter release button, this plunger being spring urged against the bearing. When the push rod is actuated by means of the pushbutton, a cam blade is moved along the bearings so as to downwardly actuate the plunger causing the actuation of the shutter release button. Adjustment means are provided to vertically adjust the position of the cam blade, the bearings and the plunger within the holder member, such that the plunger can be initially positioned so that it is directly opposite the shutter release button, thereby assuring reliable and accurate operation of the shutter release mechanism in response to pushbutton actuation.

It is therefore an object of this invention to provide improved means for actuating the shutter release button of a camera mounted within a soundproof housing.

It is a further object of this invention to improve the reliability of the remote operation of the shutter release mechanism of a camera mounted within a soundproof housing.

It is still another object of this invention to provide a remote shutter release operating mechanism for a camera mounted within a soundproof housing which can be adjusted for precise operation with each different camera which may be installed therein.

Other objects of this invention will become apparent as the description proceeds in connection with the accompanying drawings, of which:

FIG. 1 is a perspective view of a preferred embodiment of the invention;

FIG. 2 is a cross-sectional view taken along the plane indicated by 2—2 in FIG. 1;

FIG. 3 is a cross-sectional view illustrating the shutter release mechanism of the preferred embodiment;

FIG. 4 is a view taken along the plane indicated by 4—4 in FIG. 3; and

FIG. 5 is a view taken along the plane indicated by 5—5 in FIG. 3.

Referring now to the Figures, housing 11 is lined with insulating material 13 and has a front focusing tube 14 for use in focusing the camera lens, and a view finder window 16 enabling the user to see the camera viewfinder. Camera 17 is contained within the housing which has a front panel 18 attached to the main portion of the housing by means of hinges 19 and snap fasteners 20 to facilitate the installation of the camera in the housing and its removal therefrom. A knob 22 has a guard 23 and, as to be explained further on in the specification, is provided to enable the adjustment of the shutter actuation control while the camera is in the container.

The subject of the present invention which is best shown in FIGS. 3-5 is a mechanism for actuating the camera shutter from outside the housing. This mechanism includes a push rod 25 which is supported on the rear wall portion of housing 11 on one end, and on a resilient pin member 27 which is fixedly attached to housing 11 on the other end. Push rod 25 is supported on the housing wall in cap member 30, this cap member having a threaded portion 30a which fits through the housing wall and is retained thereto by means of nut 32. Support for push rod 25 is provided by means of sleeve 34 which threadably engages the threads 30a of the cap and which has a bushing 36 which may be of Teflon, through which the pushrod is fitted. Fitted on the end of rod 25 is a button member 37 which may be of a suitable material such as Teflon, this button member having a cylindrical end portion 37a which fits through an aperture formed in cap 30 and is surrounded by a circular wall portion 30b of the cap which forms a guard for the button. Pushbutton member 37 further includes a base portion 37b in the form of a disc which abuts against an inner wall of cap member 30. Button member 37 and along with its push rod 25 are resiliently urged outwardly by spring member 40 which is placed on rod 25 and abuts at one end against the base portion 37b of the pushbutton and at the other end thereof against bushing 36. Push rod 25 is fitted through an aperture 41a formed in cam blade 41. Push rod 25 has a first section 25a and a second section 25b which are at substantially right angles to each other, section 25a being mounted in cap member 30 and section 25b being fitted through the cam blade and mounted on pin 27 as already noted. Pin member 27 is of a resilient material such as Teflon and is press fitted through aperture 25c formed in push rod portion 25b.

Cam blade 41 is relatively flat and has a sloped surface portion 41b formed towards one end thereof. Sloped surface portion 41b is mounted in a slotted portion 42a of holder member 42 between bearings formed by balls 44 and 45. Also supported within holder 42 is a plunger 48 which has a head portion 48a having a pad thereon of a resilient material such as Teflon, which is directly opposite the shutter release button 50 of camera 17. Plunger 48 is resiliently urged upwardly against ball 45 by means of spring 51 which abuts at one end against a wall of holder 42 and at the other end against tab 48b at the end of the plunger. Adjustment knob 22 is threadably supported in holder 42 and has a shaft portion 22a which extends therefrom and abuts against ball 44. This knob is used to adjust the vertical position of cam blade 41 and plunger 48 relative to shutter release button 50. Thus the plunger 48 can be positioned for the optimum operation of pushbutton 37 in actuating the shutter release mechanism. This position of course can be adjusted for each particular camera that is installed in the housing. Guard member 23 is provided over adjustment knob 22 to minimize the changes of its inadvertent adjustment. Holder 42 is retained to the wall of the housing 11 by means of mounting nut 54.

While the invention has been described and illustrated in detail, it is to be clearly understood that this is intended by way of illustration and example only and is not to be taken by way of limitation, the spirit and scope of this invention being limited only by the terms of the following claims.

I claim:

1. In a soundproof housing containing a camera having a shutter release button, a shutter release mechanism for actuating said button comprising:

a push rod having first and second sections with the free end of said first section fitted through one wall of said housing and the free end of said second section resiliently supported on another wall of said housing, a cam blade having an aperture formed therein through which the second section of said push rod is slidably fitted, said cam blade further having a sloped surface at one end thereof, holder means for receiving said sloped surface portion of said cam blade, bearing means retained in said holder means on which the cam blade sloped surface portion is supported, plunger means slidably supported in said holder means extending from said bearing means outside of said holder means to a position directly opposite the shutter release button, and means for resiliently urging said plunger means against said bearing means, whereby when the free end of said first push rod section is depressed, the sloped surface of said cam blade drives said bearing means so as to drive the plunger means against the shutter release button to cause the actuation thereof.

2. The housing of claim 1 wherein said push rod sections are substantially normal to each other.

3. The housing of claim 1 wherein said bearing means comprises a pair of balls between which the cam blade is placed.

4. The housing of claim 1 and further including means for adjusting the non-actuated positions of said cam blade and said plunger means relative to the shutter release button.

5. The housing of claim 4 wherein said adjusting means comprises a knob having a shaft extending therefrom and means for threadably attaching said knob to a wall of the housing above the bearing means, the shaft of said knob abutting against the bearing means.

6. The housing of claim 1 and further including a cap member mounted on a wall of said housing through which the free end of said first push rod section is mounted, and a push button attached to the last mentioned free end.

7. The housing of claim 6 and further including spring means for resiliently urging said push rod away from the cam blade.

* * * * *